United States Patent Office 2,766,474
Patented Oct. 16, 1956

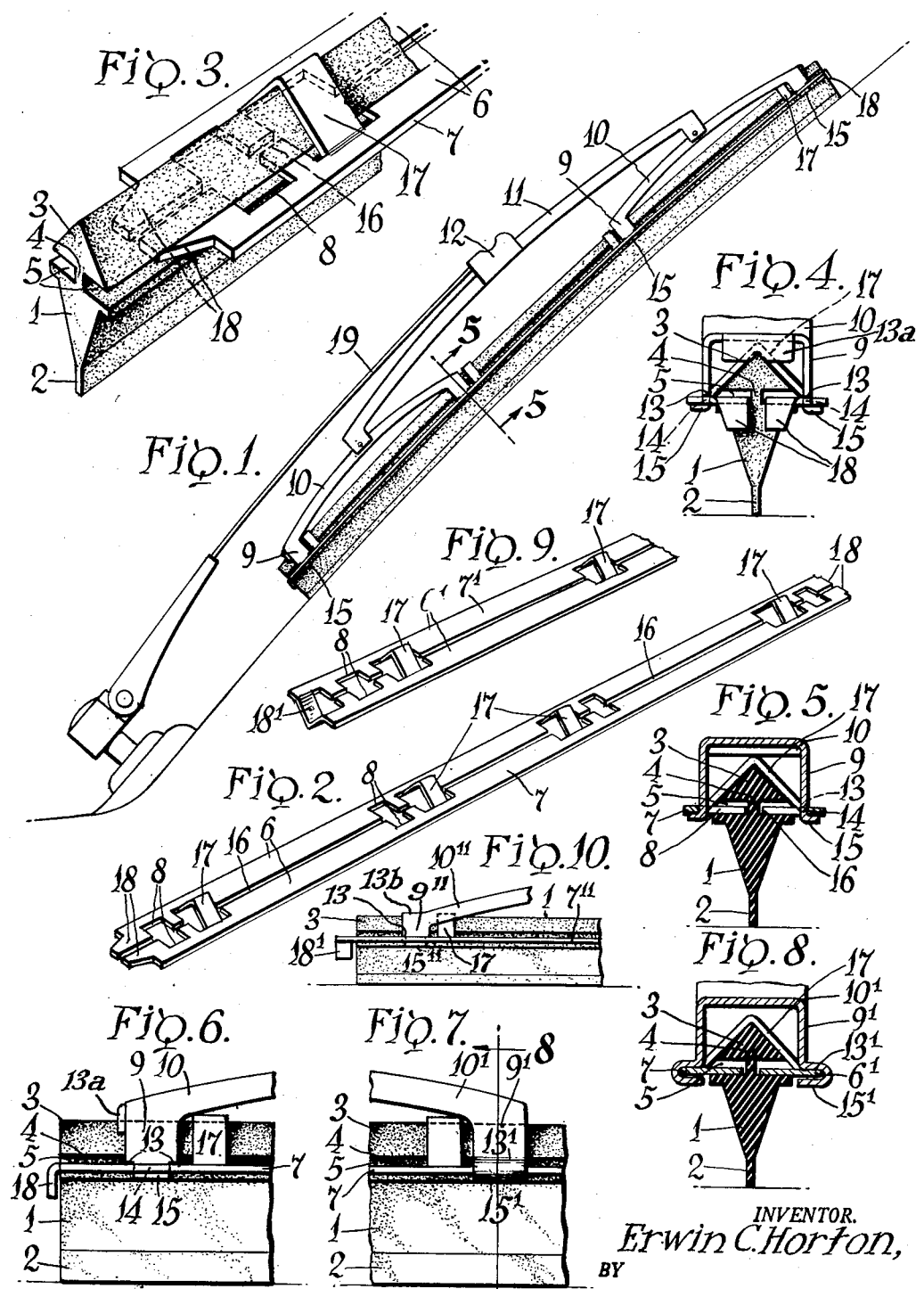

2,766,474

WINDSHIELD WIPER

Erwin C. Horton, Hamburg, N. Y., assignor to Trico Products Corporation, Buffalo, N. Y.

Application August 6, 1953, Serial No. 372,670

19 Claims. (Cl. 15—245)

This invention relates to windshield cleaners for motor vehicles and particularly to the wiper which is made flexible to conform to irregularly curved surfaces as well as other contours such as may be found in the modern automobile. The present day wipers now employed for cleaning curved windshields include a flexible blade element of rubber or rubber-like material either natural or synthetic, a flexible backing strip supporting the blade, and a pressure distributing superstructure through which the arm pressure is distributed along the backing strip to exert a surface conforming influence upon the blade for maintaining wiping contact with the windshield surface. The superstructure may include one or more secondary yokes each provided ordinarily with terminal sets of claws that slidably embrace the side margins of the backing strip. The claws at the point of embrace extend outwardly beyond the body lines of the backing strip and in so doing increase the overall width of the latter. This has the effect of producing a scratch hazard since the backing strip has a tendency to roll and dip close to the windshield, and may even contact the glass, as the wiper is oscillated over a semi-dry surface.

The present invention aims to eliminate or minimize the scratch hazard by reducing the overall width of the wiper, this being accomplished by disposing the yoke claws inwardly of the side margins of the backing strip to avoid possible contact of the claws with the glass surface.

An object of the present invention is to provide a wiper in which the downward pressure of the actuating arm is applied closer to the longitudinal axis of the blade for securing a more direct and effective application of the arm pressure to its wiping edge.

A further object of the invention is to provide a wiper construction in which the backing strip is in the form of a one-piece stamping having a longitudinally extending blade-anchoring slot through which the pressure distributing superstructure is engaged in a manner to positively brace the opposite side portions of the backing strip and strengthen the latter transversely for preserving the freedom of movement of the blade relative to its flexible support.

Again, the invention has for an object to provide a quiet acting wiper structure wherein the downward arm pressure is transmitted through cushioned contacts to dampen the usual noise incidental to a change in the wiper motion.

Again, the invention has for an object to provide a longitudinal interlock between the backing strip and a secondary yoke member.

The foregoing and other objects will manifest themselves as this description progresses, reference being made to the accompanying drawing wherein:

Fig. 1 is a side view of the improved wiper as mounted on a windshield;

Fig. 2 is a detailed perspective view of the flexible backing strip for the wiper;

Fig. 3 is a like view showing the manner of threading the blade into its flexible backing;

Fig. 4 is an end view of the improved wiper;

Fig. 5 is a transverse sectional view taken about on line 5—5 of Fig. 1;

Fig. 6 is an enlarged fragmentary side view of the wiper depicting a connection between the backing strip and one end of a secondary yoke;

Fig. 7 is a like view of a modified connection;

Fig. 8 is a cross sectional view taken about on line 8—8 of Fig. 7;

Fig. 9 is a fragmentary perspective view of a modified backing strip; and

Fig. 10 is another modification incorporating noise-dampening means to silence the stroke reversing action of the cleaner installation.

Referring more particularly to the accompanying drawing, the numeral 1 designates a flexible squeegee or blade body preferably formed of rubber or rubber-like material, either a natural rubber or substitute and having a wiping edge 2 along one longitudinal margin and an anchoring bead or head 3 along its opposite margin, the bead being joined by a neck 4 to the body. This provides a blade having outwardly facing grooves 5 which loosely receive the inner, slot defining margins of the flexible side rails 6 of a backing strip 7. These inner margins may be notched at intervals to form recesses 8 to interlockingly receive the depending pairs of claws 9 on one or both ends of the secondary yokes 10 as parts of a pressure distributing superstructure. The superstructure also includes a primary yoke 11 which rockably supports the secondary yokes and is provided with a clip 12 for attaching the wiper to a spring pressed actuating arm 19. The claws 9 are formed with shoulders 13 at the opposite sides of a reduced tongue 14 to rest upon the upper faces of the inner margins of the side rails 6 at opposite sides of the recesses 8 in applying the surface conforming arm pressure to the backing strip. One or both ends of the secondary yokes may have a transverse shoulder 13a which can be formed by turning down an extension of the top wall yoke channel. This transverse ridge lies close to the adjacent set of claws 9 and is shaped to receive and bear upon the anchoring bead 3 for normally supporting the shoulders 13 above the upper face of the backing strip. The formation of the rubber bead close to the transverse plane of the laterally spaced claws 9 provides in action the same cushion factor with the blade whether the latter is moving over a flat surface or a curved surface. This cushioned point of contact will serve to dampen the noise of operation and ease the positive contact between the shoulders 13 and the backing strip.

By insetting the recesses 8 closer to the longitudinal center of the backing strip and the blade body, a more direct application of the arm pressure is assured. Furthermore, the outer margins of the backing strip are devoid of raised projections thereby reducing the glass scratching hazard heretofore encountered through the rolling tendency of the wiper as it moves sideways.

The tongues 14 are bent outwardly to form roll-resisting shoulders 15 beneath the side rails 6 in slidingly clenching the claws to the backing. By this arrangement the backing strip, which is preferably formed of thin sheet stock, has an imparted lateral stability and its sides are positively supported against collapse. The slot 16 provides a seat to loosely receive the neck 4, and the play or clearance thus provided, together with the clearance between the walls of the lateral grooves 5 and the inner margins, afford a floating mount for the blade to permit relative movement between the two parts in effecting blade conformance to the windshield surface.

In addition to the bracing action afforded by the secondary yokes, the side rails 6 are also held spaced apart adjacent the recesses 8 by the sustaining spacers 17 which are arranged at intervals to integrally join the side rails into a one-piece stamping.

The blade is readily mounted on its flexible backing by introducing the neck lengthwise through the open end of the slot 16, as shown in Fig. 3, and passing the anchoring bead 3 beneath the sustaining spacers 17. Thereafter, the retaining stops 18, constituting continuations of the side rails, are bent downwardly to obstruct accidental displacement of the blade. For replacing the blade the latter may be deflected and threaded through an end pair of the recesses 8 serving as an entrance opening.

In the modified embodiment of Fig. 9, the end stops are formed by a rail-connecting strap 18' struck downwardly to lie over the end of the blade. This modified stop 18' is preformed at the time of stamping out the backing strip from sheet stock, pressing it downwardly while shaping the sustaining spacers 17 upwardly. Being integral with the side rails, the stops also serve as sustaining spacers and necessitate the use of an entrance opening 8 through which the blade may be threaded.

Also in this modification, one set of the terminal claws 9' of each secondary yoke 10' may straddle the backing strip 7' and slidably embrace the outer side margins of the side rails 6', or in recesses therein, to cooperate with the companion set of claws 9 on the opposite end of the secondary yoke engaging in their recesses 8. To this end the modified claws have shoulders 13', for transmitting the arm pressure downwardly, and oppositely facing shoulders 15' to prevent or resist the rolling of the backing strip. In this arrangement the sets of claws 9 and 9' serve to brace the side rails against separating as well as against collapsing.

A different physical embodiment is illustrated in Fig. 10 wherein the secondary yoke 10" has a broadened pressure transmitting shoulder 13b to cushion the contact between the yoke and the anchoring bead 3. Through this resiliency the downward pressure from the wiper actuating arm 19 is transmitted to the wiper in a silent manner. The claws 9" have the pressure transmitting shoulders 13 and from thence pass through the recesses 8 and are out-turned to provide roll-resisting shoulders 15". This arrangement forms a flexible point of support for the blade unit 1, 7", adjacent the outer end of the secondary yoke to ease the surface conformance of the wiping edge. The broad shoulder 13b will bear more firmly upon the anchoring bead for a better cushioning contact therewith.

In all forms of the invention the underlying shoulders 15, 15' and 15" serve to resist or limit the roll of the wiper about its longitudinal axis. These roll-resisting undershoulders, as well as the pressure transmitting overlying shoulders, cooperate in supporting the backing strip in its operative position. The shoulders by engaging the inner margins of the slot 16 are disposed at points within the body lines of the strip, and since the claws do not project beyond the body lines, the scratching hazard is reduced to a minimum. The backing strip is afforded practical support for holding the blade properly to wipe in an efficient manner as well as to conform to the surface contour. The braced backing is of economical design and facilitates the attachment of the blade thereto expeditiously, and while the foregoing description has been made in great particularity, it is without thought of limitation since the inventive principles are capable of assuming other physical embodiments within the spirit of the invention and the scope of the appended claims.

What is claimed is:

1. A wiper for curved windshields, comprising an elongate flexible blade body having a wiping edge along one longitudinal margin and an anchoring bead along its opposite margin joined to the body by a reduced neck to provide upper and lower shoulders at opposite sides thereof, a flexible backing strip for the blade having a slot-defining pair of inner margins engaged between the upper and lower shoulders at opposite sides of the neck, and an arm-pressure distributing superstructure including a yoke having formed on each end a pair of backing engaging claws, one pair of claws depending through the backing slot and formed over the upper and lower faces of the pair of inner margins to apply the arm pressure downwardly thereon while resisting torque stresses therein.

2. A wiper for curved windshields, comprising an elongate flexible blade body having a wiping edge along one longitudinal margin and an anchoring bead along its opposite margin joined to the body by a reduced neck to provide upper and lower shoulders at opposite sides thereof, a flexible backing strip for the blade having a slot-defining pair of inner margins engaged between the upper and lower shoulders at opposite sides of the neck, and an arm-pressure distributing superstructure including a yoke having formed on each end a pair of backing engaging claws, one pair of claws depending through the backing slot and formed over the upper and lower faces of the pair of inner margins to apply the arm pressure downwardly thereon while resisting torque stresses therein, the other pair of claws straddling the backing strip and formed over the upper and lower faces of the outer margins thereof for like purposes.

3. A wiper for curved windshields, comprising an elongate flexible blade body having a wiping edge along one longitudinal margin and an anchoring bead along its opposite margin joined to the body by a reduced neck to provide upper and lower shoulders at opposite sides thereof, a flexible backing strip for the blade having a slot-defining pair of inner margins engaged between the upper and lower shoulders at opposite sides of the neck, and an arm-pressure distributing superstructure including a primary yoke and a secondary yoke for each end thereof rockable thereon and having formed on each of its ends a pair of terminal claws depending through the slot and interlocked with its margins to resist torque and to apply surface-conforming pressure thereto.

4. A curved windshield wiper comprising a flexible wiping blade, a flexible backing strip therefor having a longitudinally extending seat arranged medially between the longitudinal side margins of the strip and supporting the blade for surface conformance, said backing strip having recesses at opposite sides of the seat, and a pressure distributing superstructure having longitudinally spaced parts slidably interlockable with the recesses to support the backing strip for surface-conforming flexure, the recesses being engageable by said parts through the seat.

5. A curved windshield wiper comprising a flexible wiping blade, a flexible backing strip therefor having a longitudinally extending seat arranged medially between the longitudinal side margins of the strip and supporting the blade for surface conformance, said backing strip having recesses at opposite sides of the seat, and a pressure distributing superstructure having longitudinally spaced parts slidably interlockable with the recesses to support the backing strip for surface-conforming flexure, the recesses being disposed inwardly from the side margins to leave the latter uninterrupted and to transmit an arm applied pressure through that portion of the backing strip intermediate the side margins.

6. A wiper for curved windshields, comprising a flexible wiping blade, a flexible backing strip therefor having a medial longitudinal slot with recesses on opposite sides thereof spaced inwardly from the longitudinal side margins of the strip, and a pressure distributing superstructure having longitudinally spaced and independently rockable yokes each formed with longitudinally and laterally spaced claws entering the recesses from above, said claws interlocking with the side walls of the recesses and formed over the upper and lower faces of the strip thereabout to hold the backing strip operative.

7. A wiper for curved windshields, comprising a flexible wiping blade, a flexible backing strip therefor having a medial longitudinal slot with recesses on opposite sides thereof spaced inwardly from the longitudinal side margins of the strip, and a pressure distributing superstructure having longitudinally spaced and independently rockable yokes each formed with longitudinally spaced sets of laterally spaced strip supporting claws, certain of said sets of claws engaging the recesses and other of said sets of claws engaging the side margins.

8. A wiper for curved windshields, comprising a flexible wiping blade, a flexible backing strip therefor having a medial longitudinal slot with recesses on opposite sides thereof spaced inwardly from the longitudinal side margins of the strip, and a pressure distributing superstructure having longitudinally spaced and independently rockable yokes each formed with longitudinally spaced sets of laterally spaced strip supporting claws, certain of the sets of claws on the remote outer ends of the yokes engaging the recesses and others of the sets of claws on the adjacent ends of the yokes engaging the side margins to support the backing strip operative.

9. A wiper for curved windshields, comprising an elongate flexible blade body having a wiping edge along one longitudinal margin and an anchoring bead along its opposite margin joined to the body by a reduced neck to provide upper and lower shoulders at opposite sides thereof, a flexible backing strip for the blade having a slot-defining pair of inner margins engaged between the upper and lower shoulders at opposite sides of the neck, and an arm-pressure distributing superstructure including a yoke having formed on each end a pair of backing engaging claws, one pair of claws depending through the backing slot and operatively supporting the backing strip.

10. A wiper for curved windshields, comprising an elongate flexible blade body having a wiping edge along one longitudinal margin and an anchoring bead along its opposite margin joined to the body by a reduced neck to provide upper and lower shoulders at opposite sides thereof, a flexible backing strip for the blade having a slot-defining pair of inner margins engaged between the upper and lower shoulders at opposite sides of the neck, and an arm-pressure distributing superstructure including a yoke having formed on each end a pair of backing engaging claws, said claws depending through the backing slot and resisting torque stresses in the backing strip.

11. A curved windshield wiper comprising a flexible wiping blade, a flexible backing strip therefor having a longitudinally extending seat arranged medially between the longitudinal side margins of the strip and supporting the blade for surface conformance, said backing strip having recesses at opposite sides of the seat, and a pressure distributing superstructure having longitudinally spaced parts slidably interlockable with the recesses to support the backing strip for surface-conforming flexure, the recesses being disposed inwardly from the side margins to leave the latter uninterrupted.

12. In a curved windshield wiper, a flexible backing strip having longitudinally extending slot means forming side rails joined at intervals by transversely arranged sustaining spacers, a flexible blade having an anchoring part engaged in the slot means of the backing strip and being conformed by the latter to the surface acted upon, and a pressure distributing superstructure including a yoke extending lengthwise of the backing strip for applying a wiping pressure to the blade, said yoke having strip-supporting parts engaged in the slot means of the backing strip to limit the lateral roll of the blade as it moves sidewise.

13. In a curved windshield wiper, a flexible backing strip divided medially by longitudinally extending slot means to form side rails joined at intervals by sustaining spacers, a flexible blade engaged in the slot means of the backing strip and having a wiping edge conformed by the latter to a surface being acted upon, and a pressure distributing superstructure including a yoke extending lengthwise of the backing strip for applying thereto a wiping pressure, said yoke having laterally spaced claws passing through the slot means and provided with lateral shoulders underlying the slot-defining margin thereof to resist the roll of the strip as the blade is moved sideways.

14. In a curved windshield wiper, a flexible backing strip having a longitudinally extending seat formed between side rails which are joined at intervals by transversely arranged sustaining spacers, a flexible blade having anchoring portions engaged in the seat between the side rails of the backing strip and conformable by the latter to the surface being wiped, and a pressure distributing superstructure including a yoke having strip-supporting claws passing downwardly through the seat and formed with lateral shoulders underlying the side rails to limit the roll of the strip as the blade is moved sideways, said yoke having a pressure transmitting shoulder bearing upon the blade and cooperating with the underlying shoulders to hold the backing strip operative.

15. In a curved windshield wiper, a flexible backing strip divided medially by longitudinally extending slot means to form side rails joined at intervals by sustaining spacers, a flexible blade having an anchoring part engaged in the slot means of the backing strip and being conformed by the latter to the surface acted upon, and a pressure distributing superstructure including a yoke extending lengthwise of the backing strip for applying thereto a wiping pressure, said yoke having strip-supporting parts passing through the slot means of the backing strip with lateral shoulders underlying the slot-defining margin thereof to resist the roll of the strip as the blade is moved sideways, said yoke having a pressure transmitting shoulder cooperating with the underlying shoulders to hold the backing strip operative, said anchoring part of the blade being resilient to cushion the contact of the pressure transmitting shoulder.

16. In a curved windshield wiper, a flexible backing strip divided medially by longitudinally extending slot means to form side rails joined at intervals by transversely arranged sustaining spacers, a flexible blade anchored along one longitudinal margin in the slot means of the backing strip and formed on its opposite margin with a wiping edge for being conformed by the strip to the surface being wiped, and a pressure distributing superstructure including a yoke having on its opposite ends laterally formed shoulders engaged in the slot means and underlying the slot defining margins thereof.

17. A curved windshield wiper comprising a flexible backing strip having side rails joined at intervals by sustaining spacers, a flexibly resilient blade having an anchoring part slidably engaged lengthwise between the rails for being conformed by the latter to a surface being wiped, certain of said sustaining spacers being shaped upwardly to overlie the anchoring part and another of said spacers being shaped downwardly to a position for interlocking the strip with such part to obstruct longitudinal displacement of the blade.

18. A curved windshield wiper comprising a flexible backing strip having side rails joined at intervals by sustaining spacers, a flexibly resilient blade having an anchoring part slidably engaged lengthwise between the rails for being conformed by the latter to a surface being wiped, certain of said sustaining spacers being shaped upwardly to overlie the anchoring part and another of said spacers being shaped downwardly to a position for engaging the blade to obstruct longitudinal displacement thereof, and a pressure distributing superstructure including a yoke extending lengthwise of the backing strip and having terminal sets of claws engaging between the side rails and having overlying and underlying shoulders loosely supporting the latter, the terminals of said yoke having cushion support on the anchoring part.

19. A curved windshield wiper comprising a flexible backing strip having side rails joined at intervals by sustaining spacers, a flexibly resilient blade having an anchoring part slidably engaged lengthwise between the rails for being conformed by the latter to a surface being wiped, certain of said sustaining spacers being shaped upwardly to overlie the anchoring part and another of said spacers being shaped downwardly to a position for interlocking the strip with such part to obstruct longitudinal displacement of the blade, and a pressure distributing superstructure including a primary yoke and two secondary yokes one for each end of the primary yoke and all extending lengthwise of the backing strip for applying a wiping pressure thereto, each of said secondary yokes being rockable about a transverse axis on the respective end of the primary yoke and having terminally arranged strip-supporting parts passing through the slot means of the backing strip with lateral shoulders underlying the slot-defining margins thereof to support the blade operative as it is moved sideways, said secondary yokes having terminally arranged pressure transmitting shoulders cooperating with the underlying shoulders to provide a tri-point support for the blade and its backing strip at each end of the secondary yokes.

References Cited in the file of this patent

FOREIGN PATENTS

| | | |
|---|---|---|
| 487,846 | Canada | Nov. 4, 1952 |
| 683,375 | Great Britain | Nov. 26, 1952 |